April 26, 1927.
E. FERRY ET AL
1,625,936
COMBINATION BRAKE AND JACK MECHANISM FOR AUTOMOBILES
Filed April 13, 1926
5 Sheets-Sheet 1
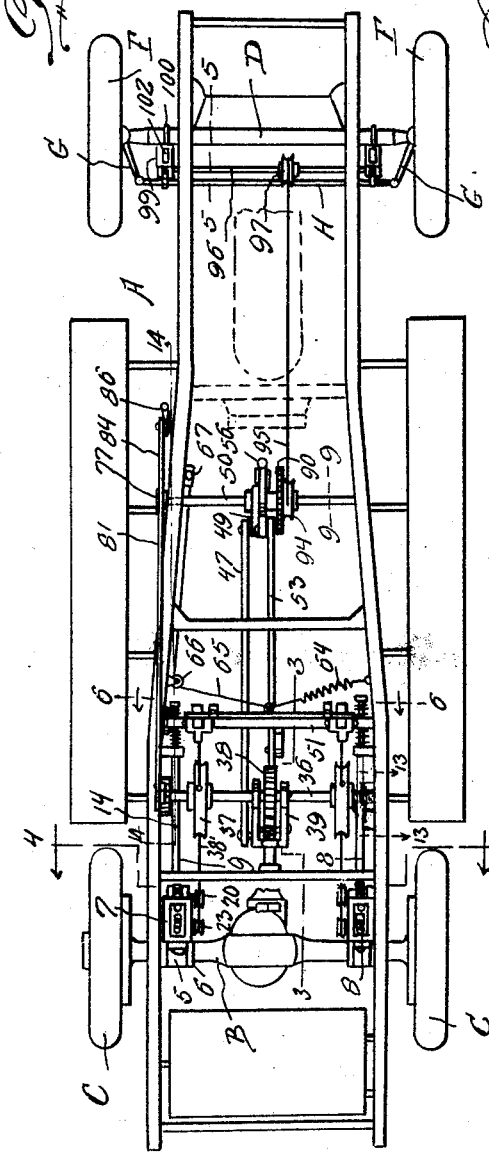
Inventors
Elmer Ferry,
Cora Ferry,
By Clarence A O'Brien
Attorney April 26, 1927.  
E. FERRY ET AL  
1,625,936  
COMBINATION BRAKE AND JACK MECHANISM FOR AUTOMOBILES  
Filed April 13, 1926 5 Sheets-Sheet 2
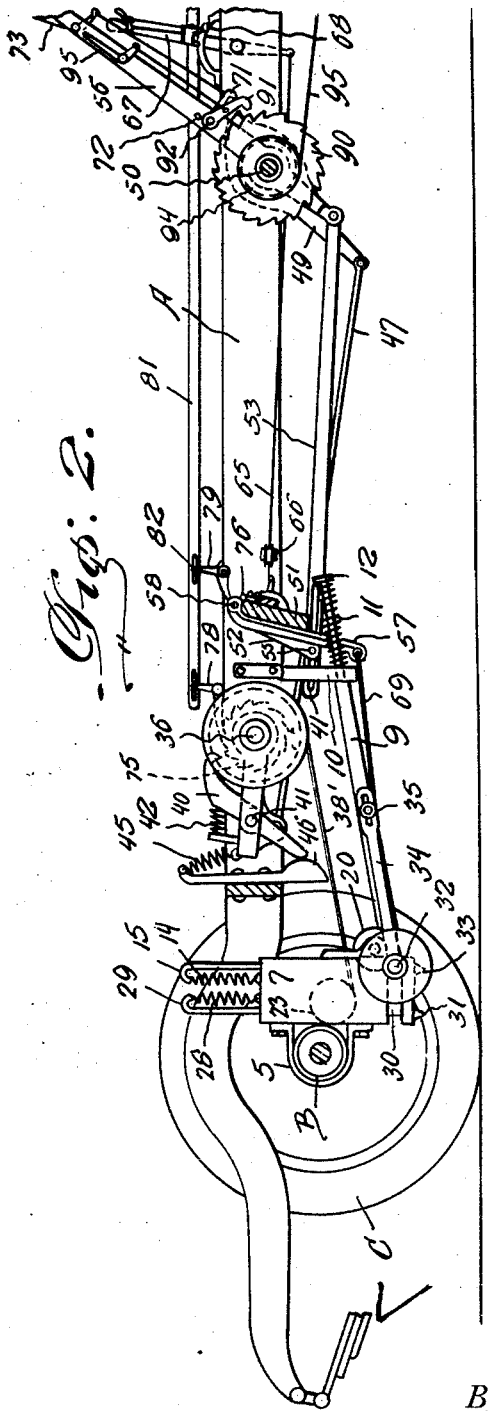
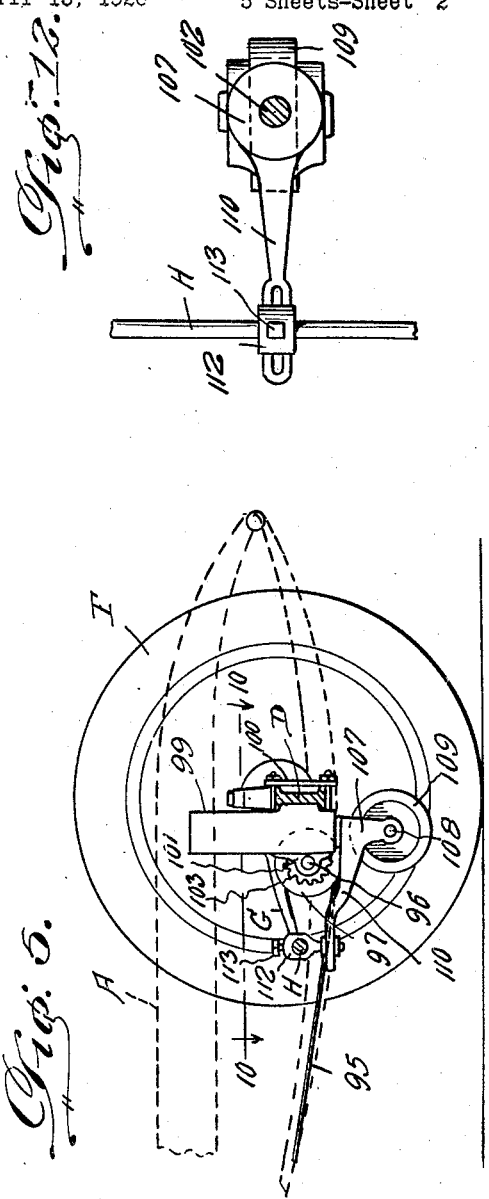
Inventors  
Elmer Ferry,  
Cora Ferry,  
By Clarence A. O'Brien  
Attorney

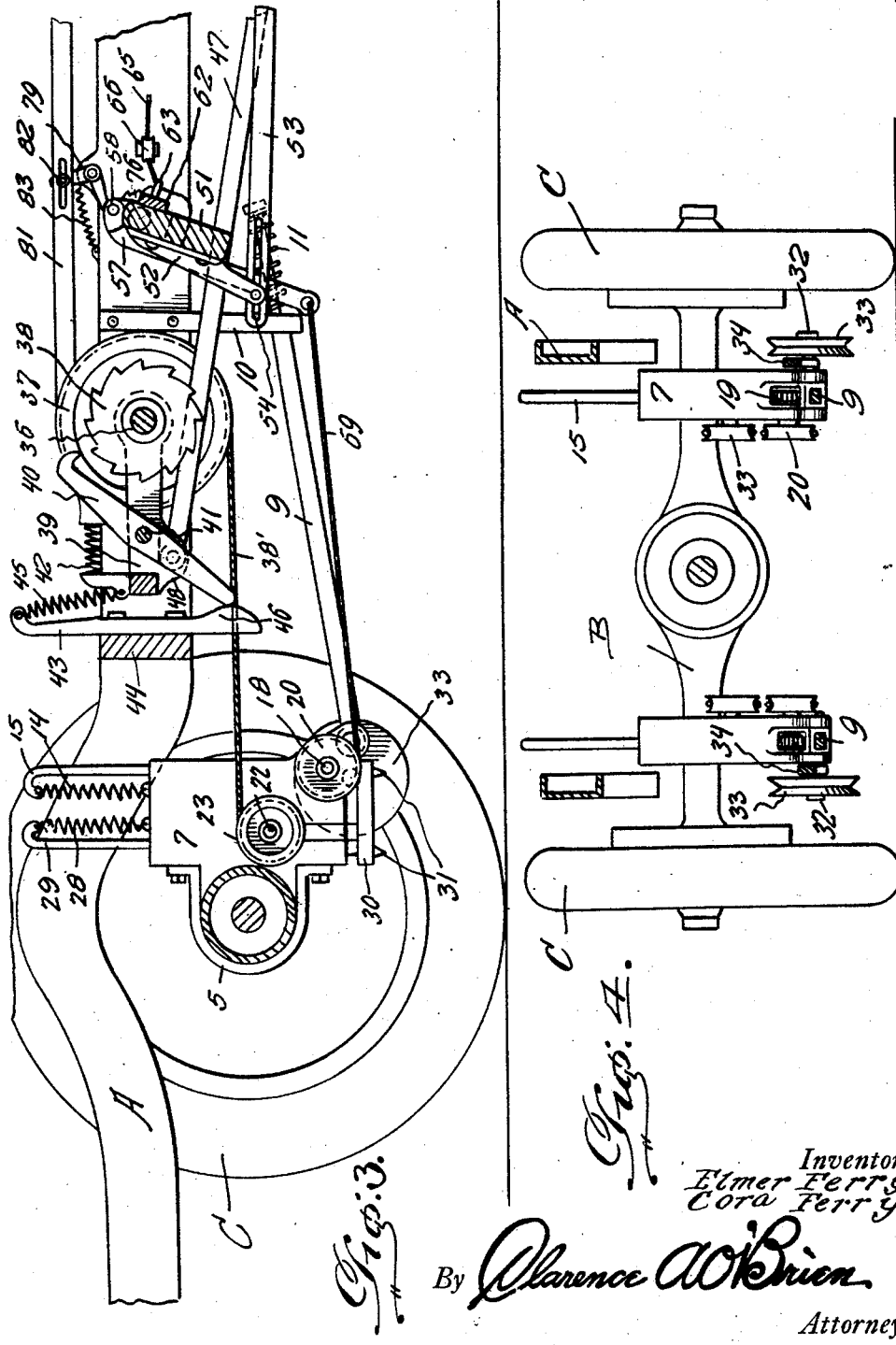

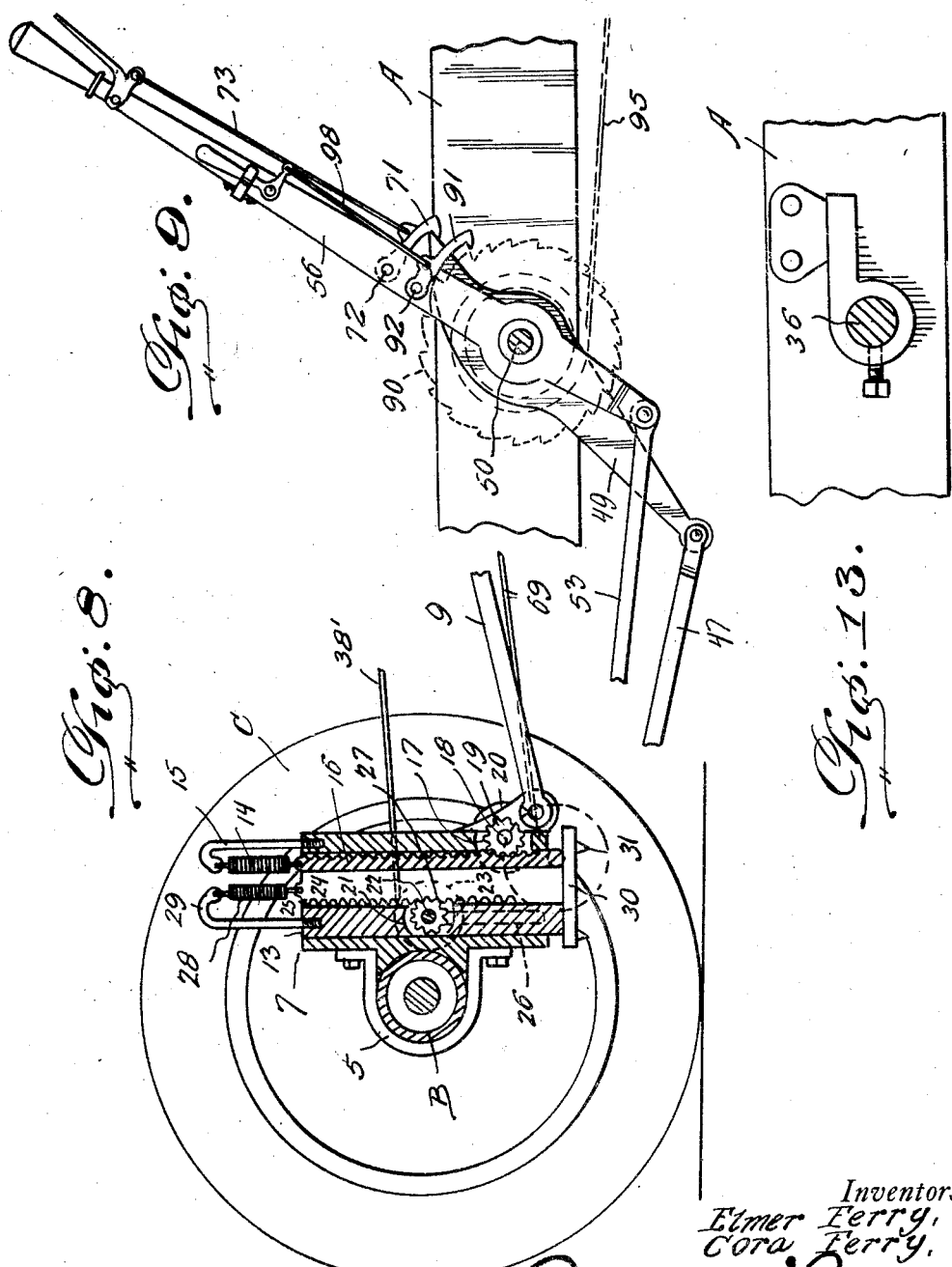

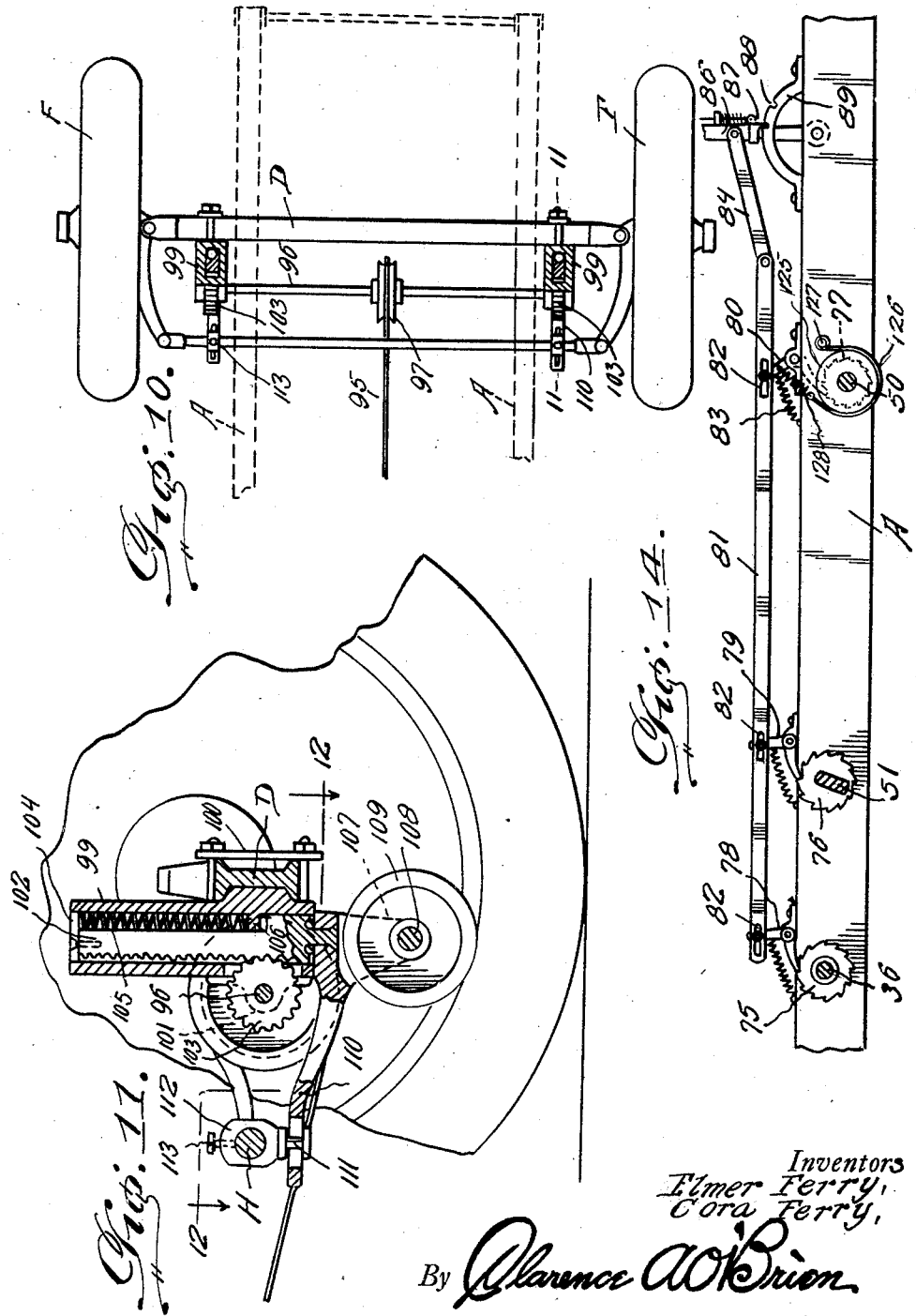

Patented Apr. 26, 1927.

1,625,936

UNITED STATES PATENT OFFICE.

ELMER FERRY AND CORA FERRY, OF BUFFALO, NEW YORK.

COMBINATION BRAKE AND JACK MECHANISM FOR AUTOMOBILES.

Application filed April 13, 1926. Serial No. 101,698.

The present invention relates to a combined brake and jack mechanism for vehicles and particularly for automobiles, and has for its principal object to provide improvements upon the structure disclosed in the patent issued to us on December 1st, 1925, No. 1,563,842.

A very important object of the present invention is to improve said patent by the provision of an anti-skidding feature, which may be brought into play when desired.

Another very important object of the invention resides in a device of this nature which is exceedingly easy to operate either for bringing into play the brake, jack, or anti-skid features.

Another very important feature of the invention resides in the provision of a jacking mechanism for the front wheels of the vehicle, which mechanism may be operated by the manipulation of the same lever for operating the combined brake, jack, and anti-skid mechanism.

Another very important object of the invention resides in the provision of a pair of anti-skid wheels which may be brought into engagement with the ground when desired for preventing side skidding of the vehicle to which the mechanism is attached.

A still further very important object of the invention resides in the provision of a mechanism of this nature with an exceedingly simple construction that will prove thoroughly efficient and reliable in operation, a mechanism which is strong and durable, not likely to easily become out of order, conveniently controlled, compact, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

The embodiment of the invention which we are about to disclose in detail is given merely by way of example, and it is to be understood that numerous changes in the details of construction, and in the combination and arrangement of parts may be resorted to, without departing from the spirit or scope of the invention as hereinafter claimed.

In the drawings:—

Figure 1 is a top plan view of an automobile chassis showing our improved mechanism associated therewith, Fig. 2 is a longitudinal section therethrough, showing the mechanism in side elevation, Fig. 3 is a fragmentary longitudinal section taken on an enlarged scale substantially on the line 3—3 of Fig. 1, Fig. 4 is an enlarged transverse section taken substantially on the line 4—4 of Fig. 1, Fig. 5 is an enlarged detail section taken substantially on the line 5—5 of Fig. 1, Fig. 6 is a detail sectional view taken approximately on the line 6—6 of Fig. 1, Fig. 7 is a detail fragmentary section taken substantially on the line 7—7 of Fig. 6, Fig. 8 is an enlarged detail vertical section taken substantially on the line 8—8 of Fig. 1, Fig. 9 is an enlarged detail section taken substantially on the line 9—9 of Fig. 1, Fig. 10 is an enlarged detail horizontal section taken substantially on the line 10—10 of Fig. 5, Fig. 11 is a vertical detail section taken substantially on the line 11—11 of Fig. 10, Fig. 12 is a detail section taken substantially on the line 12—12 of Fig. 11.

Fig. 13 is an enlarged detail sectional view taken substantially on the line 13—13 of Fig. 1, and Fig. 14 is a detail sectional view taken substantially on the line 14—14 of Fig. 1.

Referring to the drawings in detail, it will be seen that we have shown an automobile chassis of conventional formation, and indicated generally by the letter A. An axle housing B of conventional formation is mounted in the usual well known manner at the rear end of the chassis A, and has associated therewith the usual rear wheels C. A front axle D of conventional formation is mounted in the usual well known manner at the front end of the chassis A and has thereon the usual dirigible front wheels F, steerable through steering knuckles G and the usual connecting rod H. The parts thus far referred to, in detail, have been illustrated and described merely for the purpose of demonstrating the operation and utility of our invention, and it is to be understood, that the invention susceptible of use on vehicles of every description, and is in no sense limited to use with the particular vehicle herein described and shown.

Referring to the present example of the invention in detail, it will be seen that we preferably mount rotatable securing elements 5 on the rear axle housing B one adjacent each side of the chassis and held against lateral movement by collars 6 or in any other suitable manner. These securing elements 5 are secured to outer tubular members 7 and thus these members 7 may rock in relation to the axle housing for a purpose to be more clearly set out hereinafter. Each tubular member 7 is preferably rectangular in cross section or end elevation as is apparent from Fig. 1.

Bracing rods 9 are engaged with the lower ends of the outer tubular members 7 and pierce bars 10 which depend from the sides of the chassis A. Springs 11 are disposed about the forward ends of the braces 9 and impinge against heads 12 at the extremities thereof against the bars 10, thereby normally maintaining the outer tubular member 7 in a substantially vertical position. An inner tubular member 13 is telescopically mounted in the tubular member 7 and is normally held co-extensively therein by a spring 14 engaged with the upper end of the member 13 and with the upper end of a bracket rod 15 projecting upwardly from the upper end of the member 7.

One side of the inner member 13 is provided with a rack 16. One side of the member 7 is provided with an opening 17. A shaft 18 is journaled across the opening 17 in the member 7, and has fixed thereto a gear 19 meshing with the rack 16. There is also disposed on the shaft 18 a pulley 20 which when rotated causes the member 13 to be extended downwardly from the member 7. An opening 21 is provided in the member 13, and a shaft 22 extends thru the opening and is journaled in the member 13 and extends through a slot 26 provided in the member 7. A pulley 23 is fixed on the shaft 22 exteriorly of the members 7 and 13, and a gear 27 is fixed to the shaft 22 and located within the opening 21 for meshing with the rack 25 of a shank 24 slidable through the member 13.

When the pulley 23 is rotated, it will be seen that the shank 24 is to be extended downwardly from the member 13. A spring 28 is attached to the upper end of the shank 24 and to the upper end of a bracket 29 rising from the upper end of the member 13 and this spring normally holds the shank 24 within and co-extensive with the member 13. A brake shoe 30 of suitable size and formation is mounted on the lower end of the shank 24, and has calks 31 therein if desired.

Stub axles 32 project outwardly and laterally from the lower ends of the inner members 13 and have journaled thereon grooved anti-skid wheels 33 which may be brought into engagement with the ground for preventing side skidding of the automobile or other vehicle. Braces 34 project forwardly from the stub axles 32 and have pin and slot connections with intermediate portions of the braces 9 (see Fig. 2) as is indicated at 35. A shaft 36 is journaled in the chassis transversely thereof between the axle housing B and the bars 10, adjacent the latter. A pulley 37 is journaled for rotation on the shaft 36, and a cable or other suitable flexible element 38' is windable on the pulley 37 and also on the pulley 23.

A ratchet 38 is fixed to rotate with the pulley 37. This preferably accomplished by fixing both of the pulleys 37 and the ratchet 38 on the shaft 36 to rotate therewith. A U-shaped lever 39 has its ends journaled for rotation on the shaft 36 and straddles the ratchet 38. A dog 40 is pivoted as at 41 between the sides of the lever 39 and a spring 42 normally presses this dog into engagement with the ratchet 28. A bar 43 is mounted on a cross member 44 mounted in the chassis A to the rear of the shaft 36 and a spring 45 is engaged with the upper end thereof and with an intermediate portion of the lever 39 for normally holding said lever in the position shown to advantage in Fig. 3 with the lower end of the dog or pawl 40 in engagement with a hump 46 on the lower end of the bar 43 so that the pawl is disengaged from the ratchet 38.

A connecting rod 47 is engaged with an ear 48 extending from adjacent the intermediate portion of the lever 39 and extends forwardly for engagement with the lower end of a crank 49 rotatable on a shaft 50 mounted in the chassis adjacent the location of the driver's seat (not shown). From the description as it has thus far progressed, it will be seen that by rocking the crank 49 on the shaft 50 in a manner which will be described later, the connecting rod 47 may be reciprocated back and forth to impart rocking movement to the lever 39. The lever 39 moves downwardly, the pawl 40 engages the rack 38, thereby rotating the shaft 36, and the pulleys 37 to wind the cables 38' thereon and unwind said cables from the pulleys 23, thereby imparting rotary motion to said pulleys 23 for causing gears 27 through racks 25 to move the shanks 24 downwardly and outwardly of the inner members 13. This movement just described, causes the brake shoe 30 to move beyond the periphery of the anti-skid wheels 33.

Referring to Fig. 2, it will be seen that this movement is accomplished when the crank 49 is swung in a counter-clockwise direction. As said crank returns in a clockwise direction, the parts which were moved thereby, return to their normal positions in a manner which, it is thought, is quite obvious because of the spring 45 and springs 28. When the lever 39 approaches its norman horizontal position, the lower end of the pawl 40 engages the hump 46 and becomes released from the ratchet 38.

A shaft 51 is rockably mounted between the sides of the chassis A to extend transversely thereof and is disposed between shafts 36 and 50, adjacent the former. A crank 52 is fixed to the shaft 51 centrally thereof. A rod 53 is provided with an elongated slot 54 for receiving a pin 55 for projecting laterally from the extremity of the crank 52. The forward end of the rod 52 is pivotally connected with the lower end of a lever 56 rockable on the shaft 50 and shown in detail in Fig. 9. A pair of cranks 57 are hinged to the shaft 51 as at 58. These cranks 57 are provided with apertured lugs 59 projecting through openings 60 provided in the shaft 51. Guide brackets 61 are mounted on the shaft 51 for slidably receiving a bolt 62, the ends of which are normally projected through the apertured lugs 59 to maintain the cranks 7 fixed in relation to the shaft 51. An eye 63 is mounted at the center of the bolt 62 and is engaged with a spring 64, the other end of which is engaged with the right hand side of the chassis.

A cable 65 is also attached to the eye and trained through a pulley 66 mounted on the left hand side of the chassis. This cable is connected to a lever 67 which has associated therewith a rack 68 so that the lever may be shifted to three different positions. When the lever is centrally located as is centrally shown in Fig. 2, the bolt is positioned as is shown in Fig. 6. By swinging the lever 67 rearwardly, the cable is pulled, thereby releasing the bolt 62 from engagement with the lug 59 on the crank 57 adjacent the right hand side of the chassis. If the lever 67 is swung forwardly from the position shown in Fig. 2, the spring 64 will shift the bolt 62 so as to disengage with the lug 59 of the crank 57 on the left hand side of the chassis.

Cables 69 are attached to the lower extremities of the cranks 57 and are wound on the pulleys 20. It will therefore be seen that by swinging the lever 56 rearwardly from the position shown in Fig. 2, the rod 53 is pulled forwardly until the rear end of the slot 54 engages the pin 55, thereby rocking the shaft 51 through the crank 52, and simultaneously rocking the cranks 57 so their lower ends move forwardly and pull upon the cables 69, thereby rotating the pulleys 20 and the gears 19 which mesh with the racks 16 on the inner members 13.

Said inner members 13 will thus be extended downwardly from the outer members 7 until the anti-skid wheels 33 engage the ground.

These anti-skid wheels 33 may be brought into the engagement with the ground simultaneously or selectively by proper manipulation of the bolt 62 as will now be quite apparent. In actual practice, to prevent skidding, it will undoubtedly be better to operate the anti-skid wheels simultaneously.

A dog 71 is pivoted as at 72 on the lever 56 for engagement with the upper end of the lever 49. An actuating mechanism for the dog 71 is indicated generally by numeral 73. When the dog 71 is engaged with the lever 49 and said lever 56 is rocked rearwardly, the lever 49 will cause the extension of the shank 24 to dispose the shoe 30 beyond the periphery of the wheel 33 on each side of the automobile as heretofore indicated, and at this time the end of the slot 54 will have reached the pin 55 through the pulling of the rod 53 by lever 56 so that the member 13 will be extended downwardly from the member 7 on each side of the automobile and thus brake shoes 30 will be applied in engagement with the ground. If any obstacle is abutted by these shoes when extended, the member 7 may rock rearwardly at their lower ends to compensate for the same because of the springs 11 as heretofore indicated.

On the shafts 36, 58 and 50, there are fixed ratchets 75, 76, and 77 respectively, as is more clearly shown in Fig. 14 of the drawing. Pivoted dogs 78, 79, and 80 are rockably mounted on the left hand side of the chassis for engaging the respective ratchets 75, 76, and 77. These dogs 78, 79 and 80, have a pin and slot connection with a rod 81 as is indicated at 82. Springs 83 normally hold the dogs 78, 79, and 80 in engagement with their respective ratchets. A link 84 is engaged with the forward end of the rod 81 and with an intermediate portion of a lever 86 having a dog 87 in engagement with either of the notches 88 in the rack 89.

Thus by shifting the lever 86 from the position shown in Fig. 14, to a forward position with engagement with the other notch, the dogs 78, 79 and 80 may be released.

When the dogs 78 and 79 are allowed to engage ratchets 75 and 76 respectively, the mechanism may be actuated for jacking up the rear wheels. This is accomplished by disposing the bolt 62 as heretofore indicated depending as to whether both wheels are to be jacked up, or only one wheel is to be jacked up. A description of jacking up both of the rear wheels will suffice for all other examples.

The dog 71 is engaged with the lever 49 and then rocked rearwardly, this causing the engagement of the brake shoes with the ground as heretofore indicated. As the lever 56 is shifted forwardly, the shafts 36 and 51 remain stationary, and then as the lever 56 is again moved rearwardly, the shaft 36 is further operated while the shaft 51 remains stationary. The continuous rotation of the shaft 36, obviously, continues the winding of the cable 38 on the pulley 37 and the unwinding of said cable from the pulley 23, thereby further extending the inner tubular member from the outer tubular member. This takes place, in the present instance, on both sides of the machine. Obviously, only one side may be jacked up if desired by the shifting of the bolt 62 as heretofore indicated.

A ratchet 90 is fixed to the shaft 50 and is engageable with a dog 91 pivoted on the lever 56 as at 92. A pulley 94 is fixed on the shaft 50 and has a cable 95 windable thereon. A shaft 96 has a pulley 97 fixed thereon over which the cable 95 is windable. Thus by rocking the lever 56 with the dog 91, engaged with the ratchet 90, rotary motion may be imparted to the shaft 96. The dog 91 has a releasing mechanism 98 associated therewith. A tubular member 99 is clamped as at 100 to each side of the chassis on the axle D, the shaft 96 being journaled in suitable gears 101 projecting from these housings or tubular members 99.

A rack shank 102 is slidable in the tubular member 99 and is in mesh with a gear 103 fixed on the shaft 96. Thus by the rotation of said shaft 96 as heretofore indicated the shank 102 may be extended downwardly out of the tubular member 99. A top plate 104 is fixed to the upper end of the shank 102 and a spring 105 is disposed in the tubular member 99 between the plate 104 and a shoulder 106 in the lower portion of the tubular member 99, so that the spring 105 will be compressed when the shank 102 is extended for normally returning said shank into substantial co-extensive relation within the tubular member 99.

Extensions 107 depend from the shanks 102 and have stub axles 108 on which are journaled wheels 109. It will thus be seen that the forward end of the automobile may be jacked when so desired by the proper manipulation of the lever 56. Arms 110 project rearwardly from the extensions 107 and have pin and slot connections 111 with the connecting rod 8, the pin preferably being mounted on a sleeve 112 in each instance so that a set screw 113 may be used for adjusting the connection as may be found necessary. Thus it will be seen that the wheels 109 may be steered in synchronism with the dirigible wheels F.

During normal driving, the dog 87 of the lever 86 will be engaged in the forward notch 88 to maintain the dogs 78, 79 and 80 out of engagement with the ratchets 75, 76, and 77. If it is desired to engage the anti-skid wheels 33 with the ground when rounding a corner, the operator grasps the upper end of the lever 56, releasing the pawl 71 and pulls the lever 56 rearwardly, thereby moving the member 13 downwardly without extending the shaft 24 as heretofore indicated.

If the operator, however, desires to apply the brakes, he pulls rearwardly on the lever 56, allowing the dog 51 to remain in engagement with the lever 49 so that first the brake shoes move downwardly beyond the periphery of the wheels 33 by the movement of shank 24 and then the members 13 move downwardly as has been heretofore described in detail. If it is desired to jack up the rear wheels, the operator engages the dog 87 in the rear notch 88 so that the dogs 78, 79, and 80 are engaged with their respective ratchets 75, 76 and 77, and the lever 56 rocked back and forth with the dog 71 in engagement with the lever 59 as indicated heretofore, in detail.

If the front wheels are to be jacked up, the dog 71 is placed in engagement with the ratchet 90 and the lever 56 rocked back and forth. If the front wheels are to be jacked up independently of the rear wheels of course, the dog 71 is disengaged from the lever 49.

Attention is directed to a special feature of our invention wherein we provide a brake drum 125 on the shaft 50 and associate therewith a brake band 126 having one end engaged on a pin 127 projecting from chassis A, while the other end is engaged through the intermediacy of a spring 128 with the dog 80. It will thus be seen that when the dog 80 is released for allowing the free rotation of the shaft 50 so that the forward portion of the automobile will lower after having been jacked up as heretofore indicated, the spring 128 is tensioned so as to frictionally engage the brake band 126 with the brake drum 125, thereby braking the shaft 50. The tension on the spring 128 of course, may be regulated by the operator through suitable and proper manipulation of the lever 86.

It is thought that the construction, operation, utility, and advantages of this invention will now be clearly understood without a more detailed description thereof. We have disclosed the present embodiment of the invention in detail, because it will attain all of the features of advantage enumerated as desirable in the statement of the invention and the above description.

It will be readily apparent, however, that the device may be changed in numerous details to adapt it to various makes of automobiles and vehicles, without losing any of the ease or accuracy of operation or sacrificing in any way its efficiency or reliability.

We do not, therefore, desire to be limited to any particular construction or to any particular combination and arrangement of parts except as we may be limited in the appended claims.

Having thus described our invention, what we claim as new is:—

1. A combined braking and jacking mechanism including, in combination, an outer tubular member, and an inner tubular member, means for extending the inner member from the outer member, a shank slidable in the inner tubular member, means for extending the shank from the inner tubular member, means for rockably mounting the outer tubular member on a vehicle, and a yieldable brace for normally maintaining the mechanism in a predetermined position.

2. A combined braking and jacking mechanism including, in combination, an outer tubular member, an inner tubular member, means for extending the inner member from the outer member, a shank slidable in the inner tubular member, means for extending the shank from the inner tubular member, means for extending the inner tubular member from the outer tubular member, means tending to hold and return the inner member and the shank co-extensive within the outer member.

3. A combined braking and jacking mechanism including, in combination, an outer tubular member, an inner tubular member, means for extending the inner member from the outer member, a shank slidable in the inner tubular member, means for extending the shank from the inner tubular member, an anti-skid member on the inner tubular member, and a braking shoe on the shank.

4. A combined braking and jacking mechanism including, in combination, three members slidably associated with one another, one member adapted to be engaged on a vehicle, an anti-skid element on the second one of the members, a brake shoe on the third one of the members, and means for extending said third member from the first member.

5. A combined braking and jacking mechanism including, in combination, three members slidably associated with one another, one member adapted to be engaged on a vehicle, an anti-skid element on the second one of the members, a brake shoe on the third one of the members, means for extending said second member from the first member, means for extending said third member from the first member, means for rockably mounting the first member on a vehicle, and a yieldable brace for normally maintaining the mechanism in a predetermined position.

6. A combined braking and jacking mechanism including, in combination, three members slidably associated with one another, one member adapted to be engaged on a vehicle, an anti-skid element on the second one of the members, a brake shoe on the third one of the members, means for extending said second member from the first member, means for extending said third member from the first member, means tending to hold and return the members in co-extensive relationship.

7. A combined braking and jacking mechanism including, in combination, three members slidably associated one with another, one member adapted to be engaged on a vehicle, an anti-skid element on the second one of the members, a brake shoe on the third one of the members, means for extending said second member from the first member, and means for extending said third member from the first member, means for rockably mounting the first member on a vehicle, a yieldable brace for normally maintaining the mechanism in a predetermined position, and means tending to hold the members in co-extensive relationship with one another.

8. A combined braking and jacking mechanism including, in combination, three members slidably associated one with another, an anti-skid element on the second one of the members, a brake shoe on the third one of the members, means for extending said second member from the first member, means for extending said third member from the first member, means for rockably mounting the first member on a vehicle, a yieldable brace for normally maintaining the mechanism in a predetermined position, means tending to hold and return the members to position co-extensive with one another, and a mechanism and structure for causing the second mentioned means to be brought in play before the first mentioned means so that the brake shoe will be extended beyond the anti-skid elements.

9. A combined braking and jacking mechanism including, in combination, an outer tubular member, an inner tubular member, means for extending the inner member from the outer member, a shank slidable in the inner tubular member, means for extending the shank from the inner tubular member, a mechanism causing the second mentioned means to be brought into play before the first mentioned means.

10. A combined braking and jacking mechanism including, in combination, an outer tubular member, an inner tubular member, means for extending the inner member from the outer member, a shank slidable in the inner tubular member, means for extending the shank from the inner tubular member, means for rockably mounting the outer tubular member on a vehicle, a yieldable brace for normally maintaining the mechanism in a predetermined position, and means tending to hold and return the inner member and shank portion co-extensive with the outer member.

11. A combined braking and jacking mechanism including, in combination, an outer tubular member, an inner tubular member, means for extending the inner members on the outer member, a shank slidable in the inner tubular member, means for extending the shank from the inner tubular member tending to hold and return the inner member and the shank co-extensive with the outer member, and an anti-skid member on the inner tubular member and a braking shoe on the shank.

12. A combined braking and jacking mechanism including, in combination, an outer tubular member, an inner tubular member, means for extending the inner member from the outer member, a shank slidable in the inner tubular member, means for extending the shank from the inner tubular member, means for rockably mounting the outer tubular member on a vehicle, a yieldable brace for normally maintaining the mechanism in a predetermined position, means tending to hold and return the inner member and the shank co-extensive with the outer member, an anti-skid member on the inner tubular member, a braking shoe on the shank, and a mechanism for operating the second mentioned means first, and then operating the first mentioned means so that the brake shoe will be engaged with the ground.

13. In a vehicle, a combined brake and jack mechanism including two extensible members, a brake shoe on one member, an anti-skid element on the other member, and independent means for extending each member; a shaft journaled in the vehicle, a pulley fixed to the shaft, a ratchet fixed to the shaft, a lever rotatable on the shaft, a spring pressed pawl on the lever engageable with the ratchet, a cable windable on the pulley for actuating the means for extending the member on which the brake shoe is mounted, a second shaft rotatable in the frame, a crank extending from the second shaft, a cable engaged with the crank and with the other means which operates the member having thereon the anti-skid element.

14. In a vehicle, a combined brake and jack mechanism including two extensible members, a brake shoe on one member, an anti-skid element on the other member, and independent means for extending each member; a shaft journaled in the vehicle, a pulley fixed to the shaft, a ratchet fixed to the shaft, a lever rotatable on the shaft, a spring pressed pawl on the lever engageable with the ratchet, a cable windable on the pulley for actuating the means for extending the member on which the brake shoe is mounted, a second shaft rotatable in the frame, a crank extending from the second shaft, a cable engaged with the crank and with the other means which operates the member having thereon the anti-skid element, means for rocking said shaft.

15. In a vehicle, a combined brake and jack mechanism including two extensible members, a brake shoe on one member, an anti-skid element on the other member, and independent means for extending each member, a shaft journaled in the vehicle, a pulley fixed to the shaft, a ratchet fixed to the shaft, a lever rotatable on the shaft, a spring pressed pawl on the lever engageable with the ratchet, a cable windable on the pulley for actuating the means for extending the member on which the brake shoe is mounted, a second shaft rotatable in the frame, a crank extending from the second shaft, a cable engaged with the shank and with the other means which operates the member having thereon the anti-skid element, means for rocking said shaft, said means including a mechanism for imparting motion to the first mentioned shaft before imparting motion to the second mentioned shaft.

16. In a vehicle, a combined brake and jack mechanism including two extensible members, a brake shoe on one member, an anti-skid element on the other member, an independent means for extending each member; a shaft rotatable on the vehicle, a pulley fixed to the shaft, a ratchet fixed to the shaft, a cable windable over the pulley and operatively associated with the means for extending the member on which the brake shoe is mounted, a lever rotatable on the shafts, a spring pressed dog on the lever engageable with the ratchet, a rod extending from the lever, a second shaft on the vehicle, a lever on the second shaft and engaged with the rod, a third shaft rotatable in the vehicle, a crank on the third shaft, a cable extending from the crank to the means for extending the member on which the anti-skid element is mounted, a second rod, a pin and slot connection between the second rod and the crank, a third lever rockable on the second shaft and connected with the second rod, and a dog on the third lever engageable with the second lever so that said second and third levers may be rocked simultaneously.

17. In a vehicle, a combined brake and jack mechanism including two extensible members, a brake shoe on one member, an anti-skid element on the other member, an independent means for extending each member; a shaft rotatable on the vehicle, a pulley fixed to the shaft, a ratchet fixed to the shaft, a cable windable over the pulley and operatively associated with the means for extending the member on which the brake shoe is mounted, a lever rotatable on the shafts, a spring pressed dog on the lever engageable with the ratchet, a rod extending from the lever, a second shaft on the vehicle, a lever on the second shaft and engaged with the rod, a third shaft rotatable in the vehicle, a crank on the third shaft, a cable extending from the crank to the means for extending the member on which the anti-skid element is mounted, a second rod, a pin and slot connection between the second rod and the crank, a third lever rockable on the second shaft and connected with the second rod, and a dog on the third lever engageable with the second lever so that said second and third levers may be rocked simultaneously, said crank being hingedly mounted on said second shaft, means for fixing said crank in a releasable manner to said third shaft.

18. In a vehicle, a combined brake and jack mechanism including two extensible members, a brake shoe on one member, an anti-skid element on the other member, an independent means for extending each member; a shaft rotatable on the vehicle, a pulley fixed to the shaft, a ratchet fixed to the shaft, a cable windable over the pulley and operatively associated with the means for extending the member on which the brake shoe is mounted, a lever rotatable on the shafts, a spring pressed dog on the lever engageable with the ratchet, a rod extending from the lever, a second shaft on the vehicle, a lever on the second shaft and engaged with the rod, a third shaft rotatable in the vehicle, a crank on the third shaft, a cable extending from the crank to the means for extending the member on which the anti-skid element is mounted, a second rod, a pin and slot connection between the second rod and the crank, a third lever rockable on the second shaft and connected with the second rod, and a dog on the third lever engageable with the second lever so that said second and third levers may be rocked simultaneously, additional ratchets, one on the first shaft, and one on the third shaft, dogs associated with the additional ratchets, and means for holding said dogs inoperative.

19. In a vehicle, a combined brake and jack mechanism including two extensible members, a brake shoe on one member, an anti-skid element on the other member, an independent means for extending said member; a shaft rotatable on the vehicle, a pulley fixed to the shaft, a ratchet fixed to the shaft, a cable windable over the pulley and operatively associated with the means for extending the member on which the brake shoe is mounted, a lever rotatable on the shafts, a spring pressed dog on the lever engageable with the ratchet, a rod extending from the lever, a second shaft on the vehicle, a lever on the second shaft and engaged with the rod, a third shaft rotatable in the vehicle, a crank on the third shaft, a cable extending from the crank to the means for extending the member on which the anti-skid element is mounted, a second rod, a pin and slot connection between the second rod and the crank, a third lever rockable on the second shaft and connected with the second rod, and a dog on the third lever engageable with the second lever so that said second and third levers may be rocked simultaneously, said crank being hingedly mounted on the said second shaft, means for fixing said crank in a releasable manner to said third shaft, additional ratchets, one on the first shaft, and one on the third shaft, dogs associated with the additional ratchets.

In testimony whereof we affix our signatures.

ELMER FERRY.
CORA FERRY.